US006109158A

United States Patent [19]

Koelsch

[11] Patent Number: 6,109,158

[45] **Date of Patent: *Aug. 29, 2000**

[54] CUTTING DIE MOUNTING SYSTEM

[75] Inventor: Kevin W. Koelsch, Toledo, Ohio

[73] Assignee: Dynamic Dies, Inc., Holland, Ohio

[ * ] Notice: This patent is subject to a terminal disclaimer.

[21] Appl. No.: 09/255,608

[22] Filed: Feb. 19, 1999

Related U.S. Application Data

[62] Division of application No. 08/784,414, Jan. 16, 1997, Pat. No. 5,875,699.

[51] Int. Cl.[7] .............................. B26D 1/62; B26D 7/26; F16B 21/18

[52] U.S. Cl. .................................... 83/698.41; 83/698.51; 76/107.8; 411/353

[58] Field of Search ................................ 83/698.41, 663, 83/698.51, 678, 695, 660, 620, 331, 346, 347; 76/107.8; 411/353, 352, 991, 386, 180, 552, 544

[56] References Cited

U.S. PATENT DOCUMENTS

| | | | |
|---|---|---|---|
| 2,674,026 | 4/1954 | St. Palley | 83/698.41 X |
| 3,119,312 | 1/1964 | Henc . | |
| 3,437,119 | 4/1969 | Dey | 411/353 X |
| 3,474,847 | 10/1969 | Bedford, Jr. | 411/352 |
| 3,673,907 | 7/1972 | Watanabe | 83/674 |
| 3,752,042 | 8/1973 | Castille | 93/58.2 R |
| 4,020,724 | 5/1977 | Quinlan | 83/346 |
| 4,075,918 | 2/1978 | Sauer | 83/659 |
| 4,116,100 | 9/1978 | Witberg | 83/698 |
| 4,343,215 | 8/1982 | Fuchs | 83/670 |
| 4,457,196 | 7/1984 | Cady | 83/140 |
| 4,884,930 | 12/1989 | Dobbeler | 411/353 X |
| 4,948,316 | 8/1990 | Duran et al. | 411/353 |
| 4,962,683 | 10/1990 | Scheffer et al. | 83/698.41 X |
| 5,003,854 | 4/1991 | Capdebosco | 83/331 |
| 5,027,509 | 7/1991 | Barben et al. | 29/895.3 |
| 5,059,075 | 10/1991 | Kelly | 411/353 X |
| 5,073,070 | 12/1991 | Chang | 411/353 |
| 5,088,367 | 2/1992 | Cracchiolo et al. | 83/345 |
| 5,172,500 | 12/1992 | Renski et al. | 411/353 X |
| 5,429,577 | 7/1995 | Simpson et al. | 493/354 |
| 5,515,749 | 5/1996 | Sandford | 76/107.1 |
| 5,690,460 | 11/1997 | Attanasio | 411/552 X |
| 5,875,699 | 3/1999 | Koelsch | 83/698.41 |

FOREIGN PATENT DOCUMENTS

| | | |
|---|---|---|
| 3544358 | 6/1987 | Germany . |
| 172158 | 12/1921 | United Kingdom . |

*Primary Examiner*—Rinaldi I. Rada
*Assistant Examiner*—Charles Goodman
*Attorney, Agent, or Firm*—Brinks Hofer Gilson & Lione

[57] ABSTRACT

An alignment and mounting system for steel rule cutting dies and the like includes multiple elements: registration pins for ensuring proper disposition of the cutting dies on the cutting drum relative to the bolt pattern of the cutting drum, alignment guides disposed in pairs on adjacent edges of a two section die for assuring proper alignment of the two sections and captive, spring biased fasteners which facilitate rapid securement and release of the cutting die to the drum. Each component may be used individually and provides defined and quantifiable benefits. The use of all three elements in combination, however, provides a synergistic effect which speeds the accuracy and repeatability of installation and use of the cutting as well as simplifying removal.

19 Claims, 5 Drawing Sheets

CUTTING DIE MOUNTING SYSTEM

This is a division of application Ser. No. 08/784,414, filed Jan. 16, 1997 now U.S. Pat. No. 5,875,699 granted Mar. 2, 1999.

BACKGROUND OF THE INVENTION

The invention relates generally to cutting dies and more specifically to registration, guidance and securement components which facilitate rapid and accurate mounting of cutting dies on the drums of rotary die cutting machines, accurate and repeatable performance and ready removal.

Solid, laminated or corrugated fiberboard, cardboard sheet stock, corrugated plastics, vinyls, felts, cloth, automotive sound deadening materials and other non-metallic materials may be cut, slit or scored into regular or irregular shapes to form, for example, inserts, carton blanks, panels, separators and advertising displays. The resulting blanks are stored and shipped flat and folded and secured or utilized in their desired shapes at the point of use. Rotary die cutting machines represent the preferred means for cutting, slitting and scoring such non-metallic materials. These machines include an upper drum or cylinder to which is secured a rotary steel rule cutting die having serrated edge rules or blades which compress the stock against a lower, contra-rotating anvil which is covered with a stiffly resilient covering. Such rotary steel rule cutting dies are capable of providing complexly configured cut, scored and slit blanks at high production rates with exceptionally good dimensional accuracy.

In recent years, such rotary die cutters have been combined on the same production line with flexographic printing presses. The combination achieves equally impressive production capability including both multiple color printing and cutting, scoring and slitting in a single pass, continuous flow operation on fiberboard or cardboard stock.

One problem that has accompanied the shift to the unitary printing and cutting production line is that downtime of either machine for service, reconfiguration or adjustment amounts to downtime for both machines. The high production rates of these machines also encourages any attempt to minimize downtime and maximize production time.

In this regard, the standard rotary die cutting machine includes a cylinder or drum having a diameter which may vary from about 7 inches (17.8 cm.) to about 26 inches (66 cm.) which provides correspondingly varying cutting lengths. The die drums include a plurality of rows of equally spaced, threaded bolt holes which receive complementarily threaded fasteners which are utilized to secure large, curved wooden die boards containing the steel cutting rules.

While the basic design of such devices is both sound and functional and such devices perform admirably, set up of a machine for a production run reveals certain shortcomings. The cutting dies must be positioned upon the drum properly and held there by hand while several fasteners are piloted and threaded into the holes within the drum. If both the width and length of the cardboard product to be cut are greater than one-half the drum circumference, the cutting die must extend over greater than 180° of the drum and it must therefore be configured in two sections. The die sections and the steel cutting rules contained thereon must be carefully aligned in order for a proper continuous cutting, slitting or scoring pattern to be achieved. Typically, as well, the threaded fasteners, typically machine bolts, utilized to secure the cutting die to the cylinder are simply loose and must be available to setup people when necessary, must be installed in all suitable locations to properly secure the cutting die to the drum and must be fully released and recovered without being lost into the machine before the cutting die can be removed from the drum.

From the foregoing, it is apparent that improvements in the art of rotary cutting dies and their alignment and attachment devices would be both beneficial and useful.

SUMMARY OF THE INVENTION

An alignment and mounting system for steel rule cutting dies and the like includes multiple elements: registration pins for ensuring proper disposition of the cutting dies on the cutting drum relative to the bolt pattern of the cutting drum, alignment guides disposed in pairs on adjacent edges of a two section die for assuring proper alignment of the two sections and captive, spring biased fasteners which facilitate rapid securement and release of the cutting die to the drum. Each component may be used individually and provides defined and quantifiable benefits. The use of all three elements in combination, however, provides a synergistic effect which speeds the accuracy and repeatability of installation and use of the cutting die as well as simplifying removal.

It is thus an object of the present invention to provide registration and mounting components for facilitating assembly of steel rule cutting dies on the drum of a rotary die cutting machine.

It is a further object of the present invention to provide a pair of registration pins for securement to the underside of a steel rule cutting die for assuring proper registration of the cutting die with the bolt pattern of a rotary die cutting machine drum.

It is a still further object of the present invention to provide a plurality of captive threaded fasteners disposed upon a steel rule cutting die for securing the die to the drum of a rotary die cutting machine.

It is a still further object of the present invention to provide alignment guides mounted in opposed pairs along adjacent edges of a two section steel rule cutting die.

Further objects and advantages of the present invention will become apparent by reference to the following description of the preferred embodiment and appended drawings wherein like reference numbers refer to the same component, element or feature in the several figures.

DESCRIPTION OF THE PREFERRED EMBODIMENT

Figure 1:
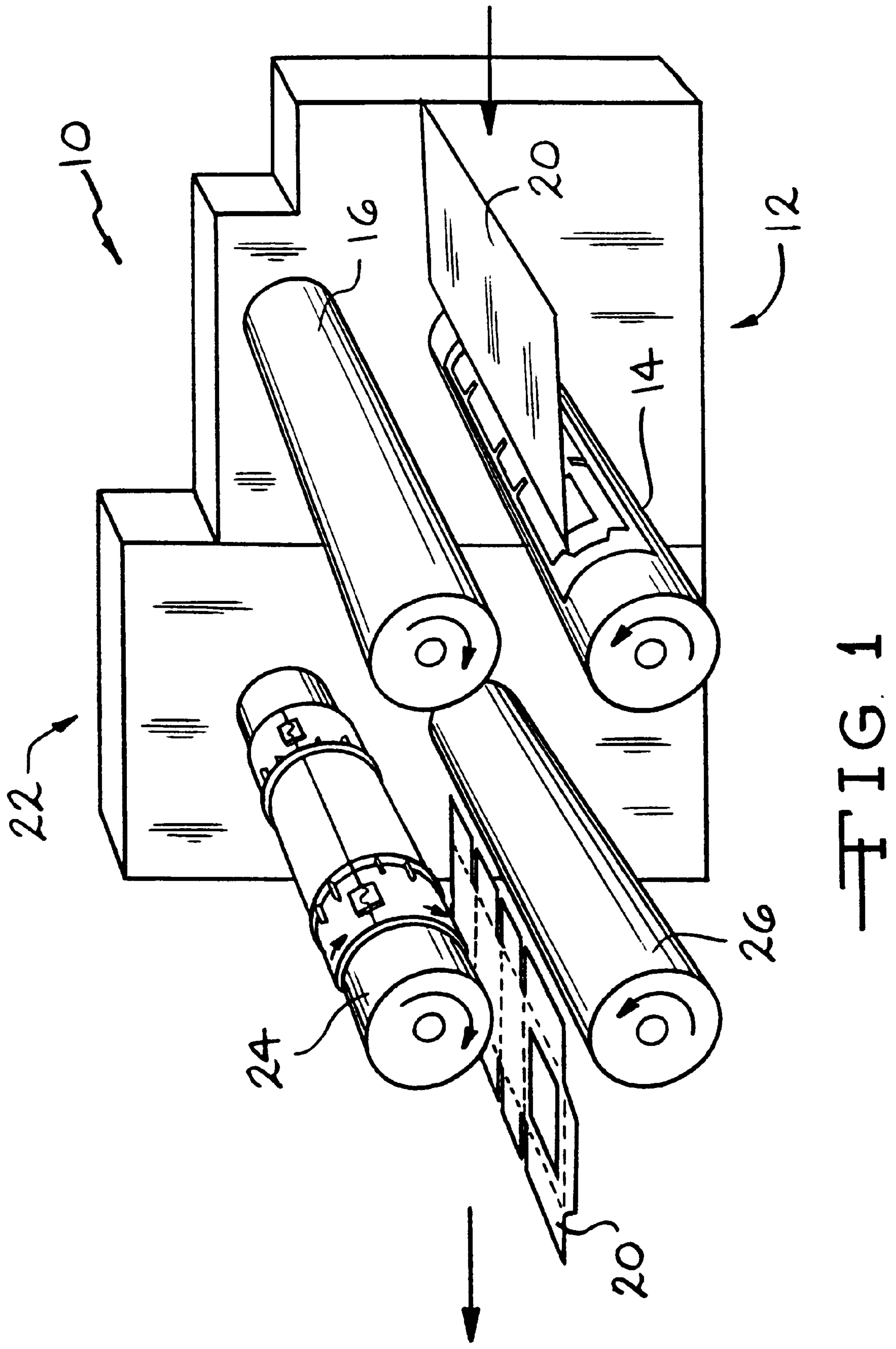
FIG. 1 is a diagrammatic view of a combination flexographic printing press and rotary die cutting machine with which the present invention may be employed.
Figure 2:
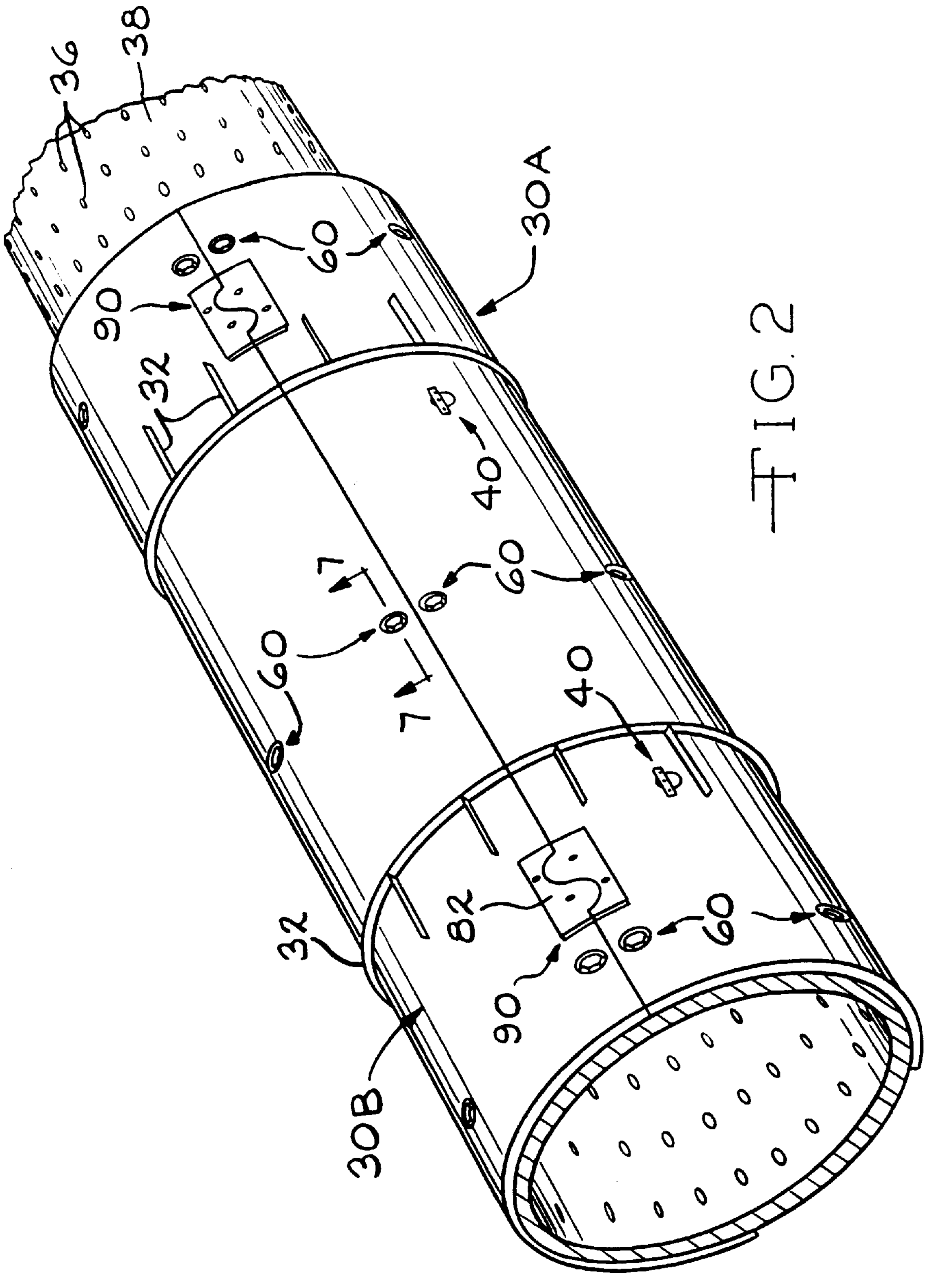
FIG. 2 is a perspective view of the two sections of a rotary steel rule cutting die according to the present invention in place on a rotary die cutting machine drum.

Referring now to FIGS. 1 and 2, a two stage printing and die cutting machine incorporating the present invention is illustrated and generally designated by the reference numeral 10. The printing and die cutting machine 10 is a two component device in which a first, printing machine stage 12 includes a lower, inked printing roller 14 and an upper, contra-rotating platen 16 constituting a flexographic printing press. The spacing between the lower printing roller 14 and the upper platen 16 has been exaggerated for clarity. In fact, the two rollers 14 and 16 are spaced apart a distance just large enough to accept and properly print upon a sheet of cardboard or fiberboard stock 20 or other material.

A second, cutting or scoring machine 22 of the printing and die cutting machine 10, which is preferably located adjacent the first machine 12 such that all operations can be achieved in a single pass of the stock 20, includes an upper die cutting cylinder or drum 24 and a contra-rotating anvil 26. Once again, the spacing between the die cutting roller 24 and the anvil 26 has been exaggerated for clarity but is typically just large enough to accept and pass the sheet of cardboard or fiberboard stock 20 while achieving the necessary cutting, slitting or scoring.

While the printing machine 12 and the cutting or scoring machine 22 have been illustrated in tandem as a cooperating pair of machines, it should be understood that each may be utilized individually and moreover that the invention relates to and is utilized only with the second, cutting or scoring, i.e., rotary die cutting, machine 22.

The cutting die cylinder or drum 24 includes one or two steel rule cutting die assemblies. In FIG. 2, a first steel rule cutting die assembly 30A and a second steel rule cutting die assembly 30B are illustrated which are typically laminates made from a plurality of thin layers of wood which are glued together. As also shown in FIG. 2, the first and second cutting die assemblies 30A and 30B each include a plurality-of serrated steel cutting rules 32 which are arranged on the face of and secured within the cutting die assemblies 30A and 30B in a pattern corresponding to the cutting, scoring or slitting desired on the sheet stock 20. The configuration of the steel cutting rules 32 and dimensional extent to which such steel cutting rules 32 project from the surface of the die assemblies 30A and 30B and thus how far they extend into the stock 20 determines whether the stock 20 is fully cut, slit, scored or perforated. The anvil 26 is covered with a stiffly resilient material which the cutting edges of the steel cutting rules 32 contact as the drum 24 and anvil 26 rotate. Typically, a plurality of resilient stripper pads (not illustrated) are positioned adjacent one or both sides of the rules 32 and assist release of the stock 20 from the cutting die assemblies 30A and 30B.

As is well illustrated in FIG. 2, the die cutting cylinder or drum 24 is a cylindrical tube having a plurality of threaded apertures 36 disposed on its exterior surface 38. As noted above, the diameter of the drum 24 may vary from approximately 7 inches (17.8 cm.) to 26 inches (66 cm.). A common diameter is 20 inches (50.8 cm.) and with this diameter the threaded apertures 36 are arranged in circumferential lines or columns at twenty-six equally spaced locations which encircle the drum 24. Smaller diameters drums 24 will typically utilize fewer apertures 36 and vice versa. These lines or columns of apertures 36 are most commonly spaced apart 2 inches (50.8 mm.) transversely (axially) across the drum 24.

Whether there is a single cutting die assembly 30A or a first cutting die assembly 30A and a second cutting die assembly 30B, they must be securely attached to the drum 24 for a production run and then removed. Typically, one or two cutting die assemblies will be unique to a product and thus a particular production facility will have a significant number of such cutting die assemblies which will be frequently or less frequently mounted upon the drum 24, used for a production run, removed and then replaced by the cutting die assemblies for a different product and subsequent production run.

Figure 3:
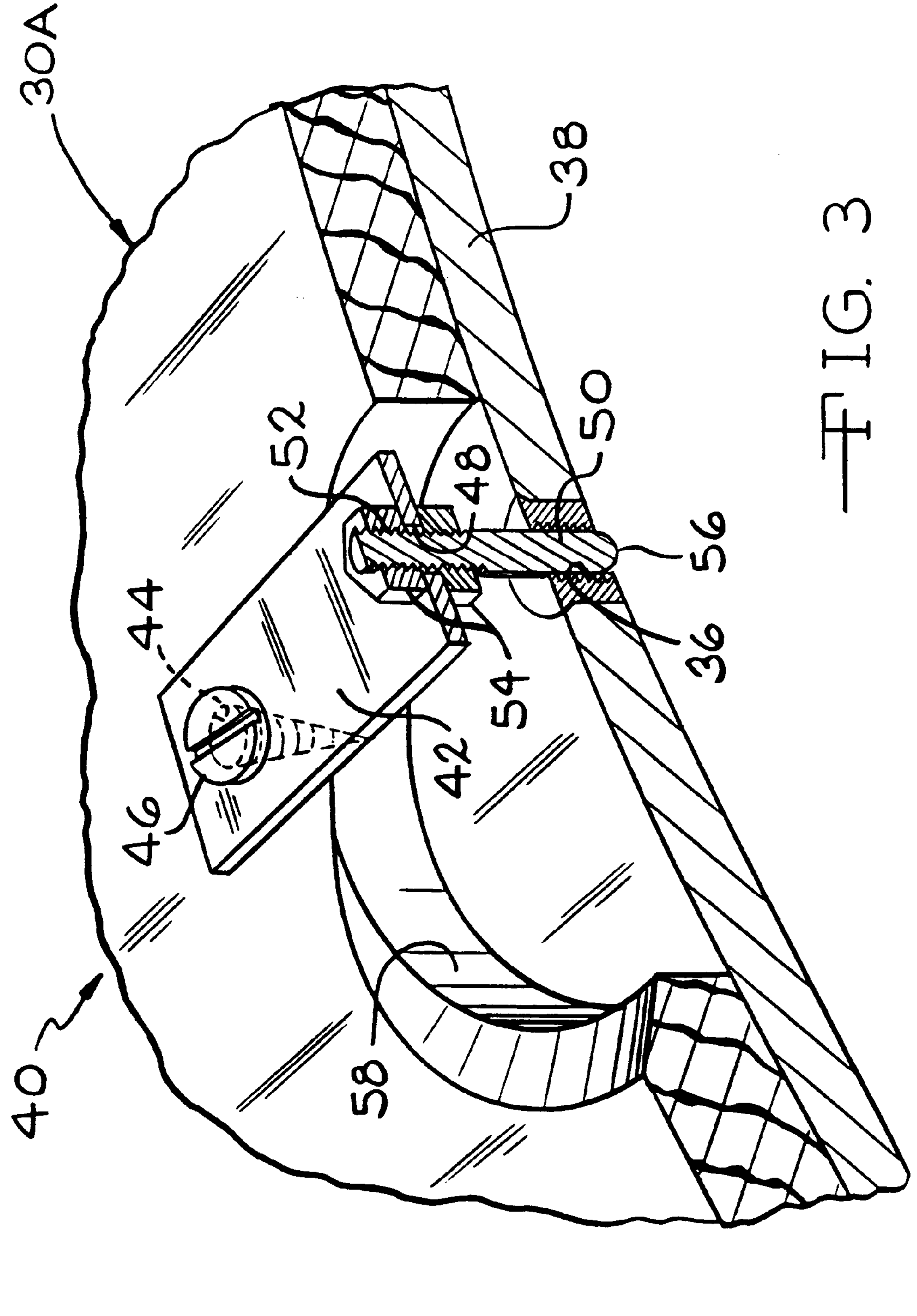
FIG. 3 is a perspective view of a registration pin assembly according to the present invention for facilitating registration of a steel rule cutting die with the bolt pattern on the die cutting machine drum.

Referring now to FIGS. 2 and 3, the installation of a single cutting die assembly 30A or the first of a pair of cutting die assemblies 30A and 30B on the drum 24 is facilitated by alignment or registration pin assemblies 40. Typically a pair of the alignment pin assemblies 40 are utilized and they are identical. Accordingly, only one of the assemblies 40 will herein be described. Each of the alignment or registration pin assemblies 40 includes a thin, flat mounting plate 42 having a pair of apertures 44 disposed adjacent each end of the plate 42 through which conventional wood screws 46 extend into the laminated wood of the die cutting assembly 30A. Centrally disposed within the mounting plate 42 is a third opening 48 through which an alignment or registration pin 50 is disposed and retained. The alignment pin 50 includes a threaded portion 52 which receives a pair of nuts 54 which are locked to retain the pin 50 upon the mounting plate 42. The alignment pin 50 includes a hemispherical terminal portion 56 which facilitates insertion of the alignment pin 50 into one of the threaded apertures 36 on the surface 38 of the drum 24. Each of the mounting plates 52 is secured to the first cutting die assembly 30A, as noted above, adjacent and partially covering an irregularly shaped, preferably oblate, opening 58 which provides appropriate mounting for the wood screws 46 and also provides reasonably unobstructed view of the alignment pin 50 and its terminal portion 56 such that alignment or registration of the pin 50 with an appropriate threaded aperture 36 and thus proper registration of the first cutting die assembly 30A on the drum 24 may be readily achieved. Preferably, plate 42 and the alignment registration pin 40 are fabricated of metal such as cold rolled steel or other suitable stiff and rugged material.

Typically and preferably, the alignment or registration pin assemblies 40 will be utilized in pairs as illustrated in FIG. 2 such that a single cutting die assembly 30A or the first of a pair of cutting die assemblies 30A and 30B may be positioned upon the drum 24 accurately, quickly and positively by inserting the alignment or registration pins 50 into appropriate ones of the threaded apertures 36 prior to securing the cutting die assembly 30A to the drum 24. The cutting die assembly 30A is thus properly positioned, i.e., registered, with the bolt pattern, i.e., the pattern of threaded bolt holes or apertures 36, on the surface 38 of the drum 24 so that it may be secured there.

Figure 6:
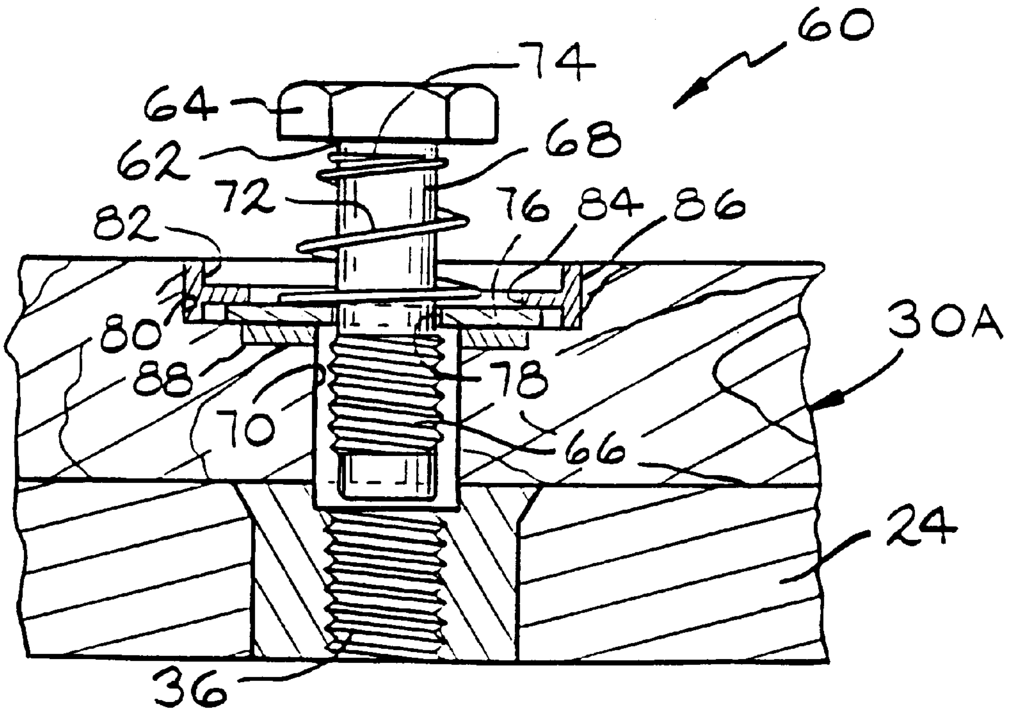
FIG. 6 is a fragmentary sectional view of a captive fastener assembly according to the present invention in place on the steel rule cutting die assembly of FIG. 2.
Figure 7:
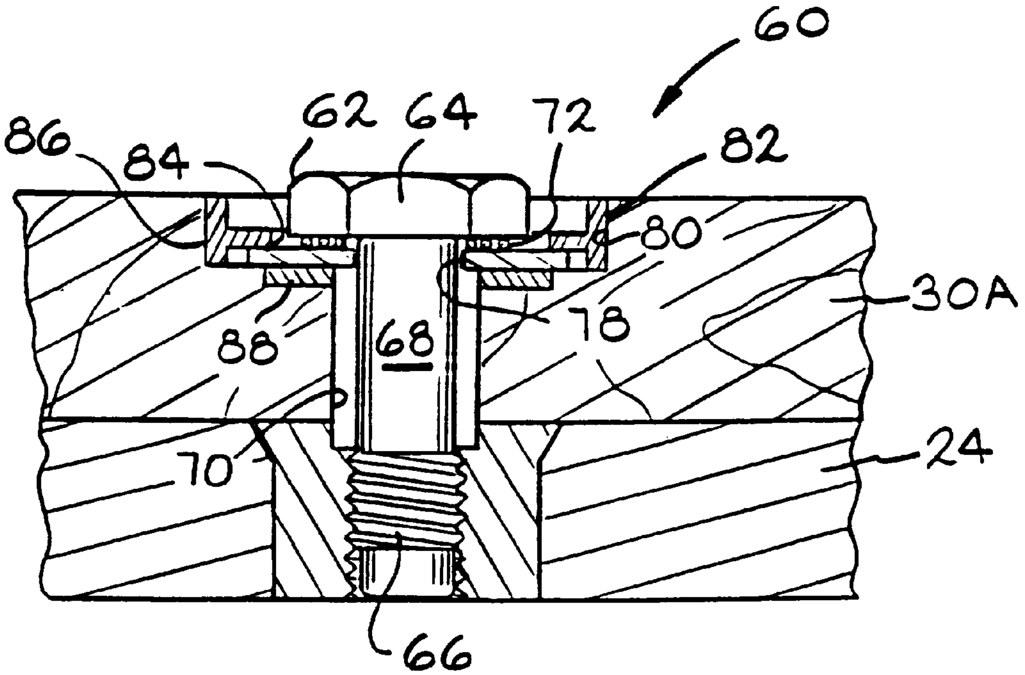
FIG. 7 is a fragmentary sectional view of a captive fastener assembly according to the present invention in its secured position taken along line 7—7 of FIG. 2.

Referring now to FIGS. 2, 6 and 7, the first cutting die assembly 30A is secured to the drum 24 by a plurality of captive fastener assemblies 60. Each of the captive fastener assemblies 60 preferably includes a threaded fastener such as a machine bolt 62 having a hexagonal head 64 or similar exterior shape or female socket or recess which may be readily and positively engaged by a suitable, complementary fastener tool. The machine bolt 62 includes rolled threads 66 which extend radially outwardly from a smaller diameter shank 68 which is loosely received within an oversized, through passageway 70 in the cutting die assembly 30A which accommodates misalignment between its nominal center axis and that of the threaded aperture 36. Disposed generally between the rolled threads 66 and the hexagonal head 64 is a frusto-conical compression spring 72 having a first end adjacent the head 64 of the machine bolt 62 formed into a substantially circumferentially continuous circular portion defining an opening 74. The opening 74 has a diameter just slightly larger than the shank 68 of the machine bolt 62 such that the compression spring 72 is loosely, slideably and freely rotatably disposed on the machine bolt 62 or, viewed oppositely, that the machine bolt 62 is loosely, slideably and freely rotatably disposed in the opening 74 of the compression spring 72.

The end of the compression spring 72 opposite the opening 74 abuts a flat washer 76. The flat washer 76 includes an aperture 78 which is slightly larger than the diameter of the shank 68 of the machine bolt 62 but smaller than the major (largest) diameter of the rolled threads 66. The compression spring 72 and the flat washer 76 are assembled on the shank 68 of the machine bolt 62 before the threads 66 are rolled. The threads 66 are then rolled on the shank 68. The compression spring 72 and the flat washer 76 are thus held captive on the machine bolt 62 by virtue of the interference between the rolled threads 66 of the machine bolt 62 which have a larger outside diameter than the diameter of the aperture 78 of the flat washer 76. Furthermore, the compression spring 72 maintains the machine bolt 62 substantially normal to the flat washer 76 and the immediately adjacent region of the cutting die assembly 30A.

The flat washer 76 is retained within a counterbore 80 in the cutting die assembly 30A by a retaining washer 82 having an aperture 84 and a peripheral band or flange 86. The peripheral flange 86 frictionally retains the washer 82 within the counterbore 80 and also spaces the planar portion of the washer 82 away from the cutting die assembly 30A such that the flat washer 76 is free to move laterally in the space defined by the lower surface of the counterbore 80 and the adjacent face of the retaining washer 82. It should be noted that a bead of adhesive may also be utilized about the periphery of the retaining washer 82 to assist retention within the counterbore 80.

The diameter of the aperture 84 of the retaining washer 82 is larger than the largest diameter of the compression spring 72 but smaller than the outside diameter of the flat washer 76. Accordingly, the flat washer 76 is retained within the counterbore 80 of the cutting die assembly 30A by the washer 82 and thus the compression spring 72 and the machine bolt 62 are also held captive thereon. It should be noted that the aperture 84 need not be circular but may include tabs, ears, flats or other discontinuous or non-circular features so long as they effect retention of the flat washer 76 within the counterbore 80. A second flat washer 88 may be disposed adjacent the flat washer 76 to assist dispersal of the compressive forces generated by the machine bolt 62 associated with securing the cutting die assembly 30A to the drum 24. It will be appreciated that the second flat washer 88 has an inside diameter substantially equal to the diameter of the through passageway 70 in the cutting die assembly 30A such that it does not interfere with the lateral, accommodating motion of the machine bolt 62.

Reference to FIG. 7 also clarifies the fact that the compression spring 72 is of a frusto-conical configuration such that when the head 64 of the machine bolt 62 compresses the spring 72, the coils of the spring 72 nest, the lower surface of the head 64 of the machine screw 62 is spaced from the flat washer 76 by only the thickness of a single diameter of the wire comprising the compression spring 72.

Given the proper alignment of the cutting die assembly 30A on the drum 24 achieved by the register pin assemblies 40, the machine bolts 62 will align with certain ones of the threaded apertures 36. The machine bolts 62, as illustrated in FIG. 2, may then be rotated and threaded into the threaded apertures 36 and tightened down to secure the first cutting rule die assembly 30A to the drum 24.

If a particular cutting rule die assembly is a two section assembly, that is, extends greater than 180° about the drum 24 such that it must be configured in two sections to allow assembly on the drum 24 or if the cutting rule die simply was fabricated in two pieces, after the first cutting rule die assembly 30A is secured to the drum 24 with the captive fastener assemblies 60, the second cutting die assembly 30B must be aligned relative to the first cutting rule die assembly 30A and subsequently secured to the drum 24.

Figure 4:
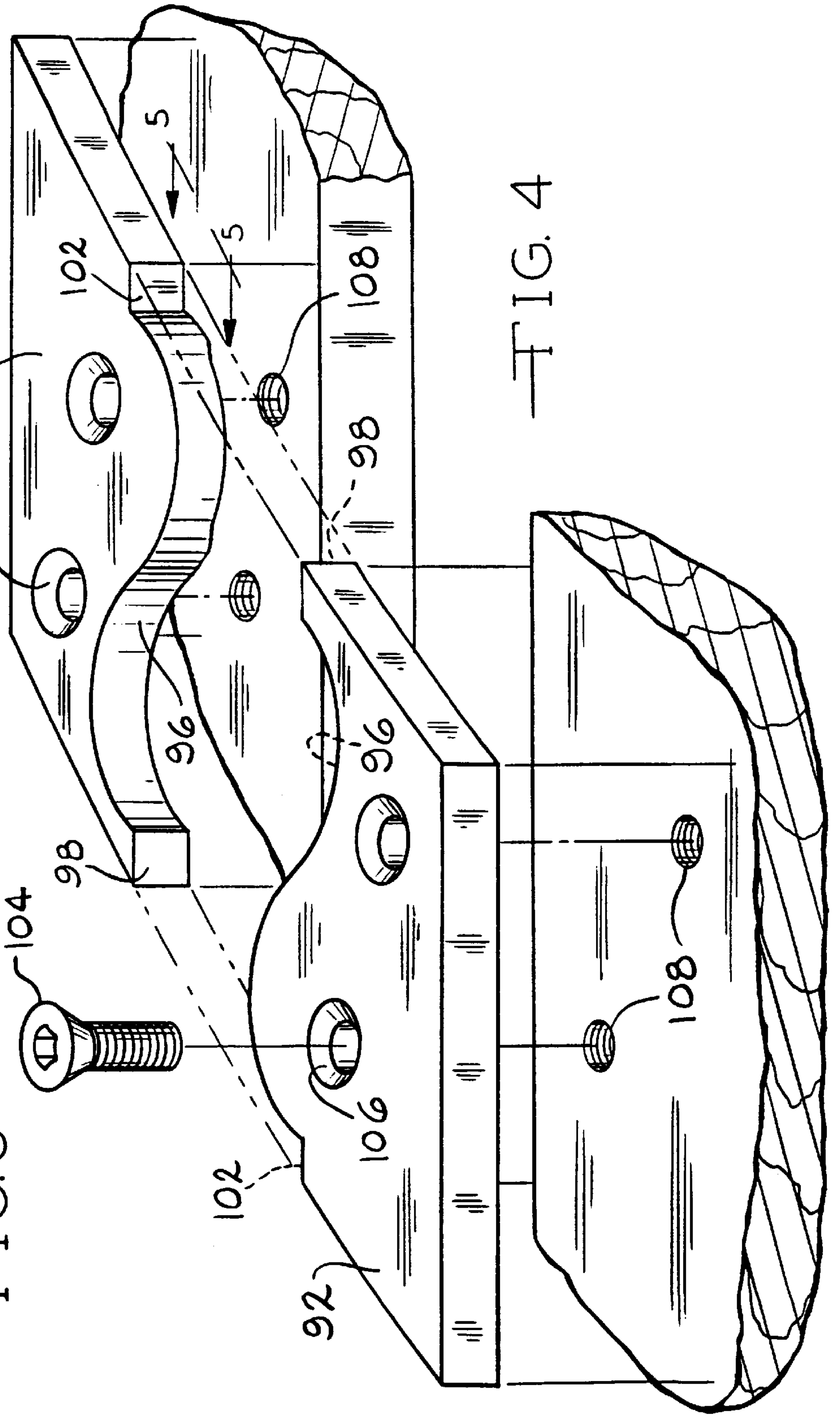
FIG. 4 is an exploded perspective view of a pair of alignment guides according to the present invention for use in pairs on adjacent edges of a two section steel rule cutting die.

This is achieved by pairs of guide assemblies 90. Each of the guide assemblies 90 comprise two identically configured guide plates 92 which are secured to the outer surface of the cutting rule die assemblies 30A and 30B adjacent opposed edges. The guide plates 92 each include a sinuous, i.e., convex, projecting and concave, recessed, curved surface 96. The convex and concave portions of the curved surface 96 are both preferably semi-circular. The curved surface 96 terminates at one end in a flat projection 98 and at the other end in a flat recessed surface 102. Because the two guide plates 92 are identical, when they are disposed in opposition on the edges of the cutting die assemblies 30A and 30B, as illustrated in FIG. 4, they register precisely and register the associated first cutting die assembly 30A and the second cutting die assembly 30B equally precisely.

Figure 5:
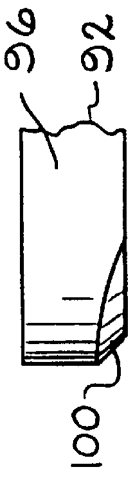
FIG. 5 is a fragmentary sectional view of a portion of an alignment guide according to the present invention taken along the line 5—5 of FIG. 4.

The guide plates 92 are not flat but rather have a slight curvature from front to back, the radius of such curvature being equal to the radius of the cutting die assemblies 30A and 30B such that the plates 92 conform accurately to the surface to which they are secured. The guide plates 92 are secured by suitable threaded fasteners 104 which are received within countersunk apertures 106 in the plates 92 and seat within complementarily threaded apertures 108 in the cutting die assemblies 30A and 30B. As illustrated in FIG. 5, the projections of the curved surfaces 96 include a slight chamfer 100 on the underside to assist alignment and positioning of the cutting rule die assemblies 30A and 30B. While the sinuous curved surface 96 is the preferred configuration of the edge of the guide plates 92, other shapes such as triangular, multiple irregular triangles, trapezoidal (oblique edges on opposite sides of an end flat) or other mating complementary profiles may be utilized.

After the second cutting die assembly 30B is properly positioned on the drum 24 with the curved surfaces 96 of the guide plates 92 juxtaposed, the captive fastener assemblies 60 included thereon may be tightened down to the positions illustrated in FIG. 7 to secure the second cutting die assembly 30B to the drum 24. At this time, the steel rules 32 of the cutting die assemblies 30A and 30B will be aligned, the cutting die assemblies 30A and 30B will be properly registered upon the drum 24 and production of the sheet stock 20 may commence. Removal of the first cutting die assembly 30A or the first and second cutting die assemblies 30A and 30B may be achieved by simply releasing all of the mounting bolts 62 of the threaded fastener assemblies 60. While they may be backed fully out of the threaded apertures 36 in the drum 24, the flat washers 76 will retain the machine bolts 62 on the cutting die assemblies 30A and 30B such that, first of all, they will not fall into the cutting and scoring machine 22 and, second of all, they will be ready for use when the die cutting assemblies 30A and 30B are subsequently reattached to the drum 24.

The foregoing disclosure is the best mode devised by the inventor for practicing this invention. It is apparent, however, that apparatus incorporating modifications and variations will be obvious to one skilled in the art of rotary die cutting. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A cutting die having integral mounting components comprising, in combination, a cutting die having a first surface, a second surface and a plurality of through openings, a plurality of washers each defining an aperture of a first diameter, said plurality of washers disposed on said cutting die with said apertures aligned with said through openings, a plurality of retainers for retaining said washers on said cutting die, a plurality of fasteners each including a head portion, a shank portion having a second diameter and a threaded portion having a third diameter, said third diameter larger than said second diameter and said first diameter larger than said second diameter and smaller than said third diameter, each of said shank portions of said plurality of fasteners captively disposed in an aperture of one of said plurality of washers, and a plurality of compression springs, one of said plurality of compression springs disposed about each of said shanks of said plurality of fasteners between said head portions of said fasteners and said washers.

2. The cutting die of claim 1 further including a plurality of counterbores on said first surface of said cutting die for receiving said pluralities of retainers and washers.

3. The cutting die of claim 2 wherein said plurality of retainers loosely retain said plurality of washers in said plurality of counterbores.

4. The cutting die of claim 1 wherein said plurality of compression springs are conical in a relaxed state.

5. The cutting die of claim 1 wherein said head portions of said plurality of fasteners define hexagons.

6. The cutting die of claim 1 wherein said plurality of washers are radially adjustable within said plurality of counterbores.

7. The cutting die of claim 1 wherein said head portions of said plurality of fasteners have a tool engageable drive structure, said shank portions of said plurality of fasteners extends from said head portions and said threaded portions of said plurality of fasteners are generally opposite said head portions.

8. A cutting die having retained securement components comprising, in combination, a cutting die having a first surface, a second surface and a plurality of through openings, a plurality of washers each defining an aperture of an inside diameter, said plurality of washers disposed on said cutting die with said apertures aligned with said plurality of through openings, a plurality of retainers for retaining said washers on said cutting die, a plurality of fasteners each including a head portion, a shank portion having a first outside diameter and a threaded portion having a second outside diameter, said second outside diameter larger than said first outside diameter and said inside diameter larger than said first outside diameter and smaller than said second outside diameter whereby said plurality of fasteners are captively disposed in said apertures of said plurality of washers, and a plurality of compression springs, one of said plurality of compression springs disposed about each of said shanks of said plurality of fasteners between said head portions of said fasteners and said washers.

9. The cutting die of claim 8 wherein said plurality of compression springs are conical in a relaxed state.

10. The cutting die of claim 8 further including a plurality of counterbores on said first surface of said cutting die for receiving said pluralities of retainers and washers.

11. The cutting die of claim 10 wherein said washers define an outer diameter smaller than an inside diameter of said counterbores.

12. The cutting die of claim 8 wherein said plurality of through openings are arranged in a pattern corresponding to openings in a machine drum.

13. The cutting die of claim 8 wherein said head portions of said plurality of fasteners define hexagons.

14. The cutting die of claim 8 wherein said head portions of said plurality of fasteners have a tool engageable drive structure, said shank portions of said plurality of fasteners extend from said head portions and said threaded portions of said plurality of fasteners are generally opposite said head portions.

15. A curved die having retained attachment components comprising, in combination, a curved die having an interior surface, an exterior surface and a plurality of through openings, a plurality of washers each defining an aperture having a diameter, said plurality of washers disposed on said cutting die with said apertures aligned with said plurality of through openings, a plurality of retainers for retaining said washers on said cutting die, a plurality of fasteners each including a head portion, a shank portion having a diameter and a threaded portion having a diameter, said diameter of said threaded portion larger than said diameter of said shank portion and said diameter of said aperture in said washers larger than said diameter of said shank portion and smaller than said diameter of said threaded portion, each of said shank portions of said plurality of fasteners captively disposed in a respective one of said apertures of said plurality of washers, and a plurality of compression springs, each of said compression springs disposed about one of said shanks of said plurality of fasteners between said head portions of said fasteners and said washers.

16. The cutting die of claim 15 further including a plurality of counterbores in said exterior surface of said die for receiving said pluralities of retainers and washers.

17. The cutting die of claim 16 wherein said washers define an outer diameter smaller than an inside diameter of said counterbores.

18. The cutting die of claim 15 wherein said plurality of compression springs are conical in a relaxed state.

19. The cutting die of claim 15 wherein said head portions of said plurality of fasteners has a tool engageable drive structure, said shank portions of said plurality of fasteners extend from said head portions and said threaded portions of said plurality of fasteners are generally opposite said head portions.

* * * * *